United States Patent
Jen

(10) Patent No.: US 6,783,827 B2
(45) Date of Patent: Aug. 31, 2004

(54) METHOD OR DECREASING THE CYCLIC OLIGOMER CONTENT IN POLYESTER PRODUCT

(75) Inventor: Zo-Chun Jen, Taipei (TW)

(73) Assignee: Nan Ya Plastics Corporation, Taipei (TW)

(*) Notice: Subject to any disclaimer, the term of this patent is extended or adjusted under 35 U.S.C. 154(b) by 4 days.

(21) Appl. No.: 10/325,110

(22) Filed: Dec. 20, 2002

(65) Prior Publication Data

US 2004/0122206 A1 Jun. 24, 2004

(51) Int. Cl.$^7$ .................. B29D 22/00; C08G 63/68; C08K 5/49
(52) U.S. Cl. ............ 428/35.7; 528/212; 528/275; 528/279; 528/283; 528/286; 528/287; 528/302; 528/308; 528/308.6; 525/437; 524/706; 524/711; 524/713; 524/777; 524/788
(58) Field of Search ................. 528/212, 275, 528/279, 283, 285, 286, 287, 302, 308, 308.6; 525/437; 524/706, 711, 713, 777, 788

(56) References Cited

U.S. PATENT DOCUMENTS

| | | | |
|---|---|---|---|
| 5,744,572 A | 4/1998 | Schumann et al. | |
| 5,948,458 A | 9/1999 | Swartz et al. | |
| 6,020,421 A | 2/2000 | Fukushima et al. | |
| 6,156,441 A | 12/2000 | Hamada et al. | |
| 6,392,005 B1 | 5/2002 | Jen | |

FOREIGN PATENT DOCUMENTS

| | | |
|---|---|---|
| JP | 59025815 | 2/1984 |
| JP | 03047830 | 2/1991 |
| JP | 03174441 | 7/1991 |
| JP | 06234834 | 8/1994 |
| JP | 09221540 | 8/1997 |
| JP | 09296029 | 11/1997 |
| JP | 10110026 | 4/1998 |
| JP | 10168168 | 6/1998 |
| JP | 11080520 | 3/1999 |
| JP | 2000080284 | 3/2000 |
| JP | 2000198937 | 7/2000 |
| JP | 2000204229 | 7/2000 |
| JP | 2000219729 | 8/2000 |
| JP | 2000219731 | 8/2000 |

*Primary Examiner*—Samuel A. Acquah
(74) *Attorney, Agent, or Firm*—Johnson & Associates P.C.; Chauncey B. Johnson, Esq.

(57) ABSTRACT

The present invention relates to a method for decreasing the cyclic oligomer content level in the manufacturing process of polyethylene terephthalate (PET) and in the PET products produced from said process by adding calcium phosphate at least one selected from the group consisting of a $Ca_3(PO_4)_2$ structure and a $Ca_5OH(PO_4)_3$ structure, and a carboxy phosphonic acid having a structure (1) as follows:

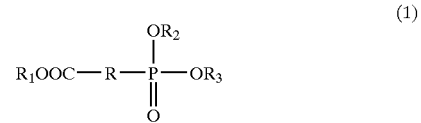

(1)

wherein $R_1$, $R_2$, and $R_3$ are alkyls or hydrogen atoms and R is an alkyl. The method of the prevent invention restrains the production of cyclic oligomers in the polyester chips produced and also decreases the cyclic oligomers regenerated in the rear-end melting process stage of the invention.

14 Claims, No Drawings

METHOD OR DECREASING THE CYCLIC OLIGOMER CONTENT IN POLYESTER PRODUCT

BACKGROUND OF THE INVENTION

1. Field of this invention

The present invention relates to a method for decreasing the cyclic oligomer content in polyester products, which improves the method disclosed in our U.S. Pat. No. 6,392,005. More particularly, the present invention relates to a method for decreasing the cyclic oligomer content in polyester products by adding other chemicals during the manufacturing process of polyethylene terephthalate (hereafter "PET"), which further restrain the cyclic oligomer residue in the chips and decrease the amount of regenerated cyclic oligomer at the rear-end stage melting process. The resulting PET material is then transformed into products such as polyester bottles, polyester fibers, polyester films, and polyester laminate structures through different manufacturing processes.

2. Description of Prior Art

PET is well known as a heat plasticized plastic material having good physical characters and a capable of being recycled. Thus, PET is widely used in manufacturing products such as polyester bottles, polyester fibers, polyester films, and polyester laminate structures, which renders PET an extremely valuable plastic material.

However, during the process of manufacturing PET cyclic oligomers having low molecular weight, particularly those oligomers exhibiting white crystallized powder characteristics, are produced from side reaction. These cyclic oligomers with a melting point of above 300° C. usually pollute the mold equipment while being processed, and further adhere to the final, processed polyester products. Consequently, the production line is often shut down and cleaned from time to time. Moreover, during the high temperature heat crystallization process in which the PET is transformed into heat-filling resistance bottles and the crystallization temperature and the heat filling temperature are above 80° C., most of the residual cyclic oligomers in the PET or the cyclic oligomers regenerated during processing are often transferred to the surface and/or frequently enter into the packaged contents which may be hazardous to human health.

To solve the cyclic oligomer problem, we disclosed in U.S. Pat. No. 6,392,005 adding - during the melting process of PET - a compound (hereinafter called P1) containing phosphorus in an amount of between 50–3000 ppm based on the total weight of the PET, which effectively decreased the cyclic oligomer content in the PET chips and their respective manufactured products. The compound proposed in our previous patent has the following structure:

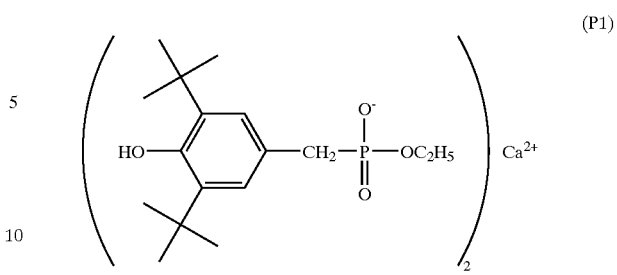

Below we list examples of prior art and/or publications that have suggested ways of decreasing the cyclic oligomer content in PET chips and their respective manufactured products thereof:

(1) Japan publication No. 12–219731 discloses that addition of $SO_3X$ compound effectively restrains the produced cyclic oligomer content in polymerized PET in the melted state;

(2) Japan publication No. 12–204229 discloses that addition of alkali metals or alkaline-earth metals such as calcium acetate or magnesium benzoate into PET containing germanium catalyst can effectively restrain the cyclic oligomer content;

(3) Japan publication No. 12–219729 discloses that when each mole of PET contains between $0.5 \times 10^{-4}$–$4 \times 10^{-4}$ moles of antimony element and between $1 \times 10^{-4}$–$5 \times 10^{-4}$ moles of phosphoric acid, the mole ratio of the antimony element to the phosphorus element is between 1–3 and the cyclic oligomer content is effectively restrained;

(4) Japan publication No. 12–198937 discloses that when the germanium element is between $0.5 \times 10^{-4}$–$4 \times 10^{-4}$ moles relative to the acid component of the PET the phosphoric acid is added until the phosphorus element is between $1 \times 10^{-4}$–$7 \times 10^{-4}$ moles relative to the acid component of the PET, at which time the mole ratio of the germanium element to the phosphorus element is greater than 1.6 and thus effectively restrains the cyclic oligomer content;

(5) Japan publication No. 12–80284 discloses melt blending the PET chips with heat-plasticized-resin master batch, which contains one of the following three structural compounds: alkylene oxide, polyalkylene glycol or bisphenol. The analyzed cyclic oligomer content of the PET resin observed is much lower than the PET resin obtained from similar process without these compounds;

(6) Japan publication No. 11-80520 discloses that less pollution exist in the blow molding equipment during blow-molding when amide compounds are added into the solid-state polymerized PET;

(7) Japan publication No. 10-168168 discloses a process for producing the PET chips containing between 2~4 wt% of diethylene glycol by using an amorphous state germanium dioxide as a catalyst. The time to add the amorphous state germanium dioxide catalyst is when the esterification reaction ratio reaches above 90%, so as to reduce the production of formaldehyde, acetaldehyde, and cyclic oligomers during the injection-molding process;

(8) Japan publication No. 10-110026 discloses that the addition of alkaline metals and alkaline earth metals such as lithium acetic, calcium acetic can restrain the cyclic oligomer content of ester chips and their manufactured bottles thereof;

(9) Japan publication No. 9-221540 discloses that when the diethylene glycol (DEG) content of the PET chips is between 1–4 mole%, the intrinsic viscosity is between 0.60-0.90 dl/g, the phosphoric acid content based on the total weight of the PET is between 5-25 ppm, the content of the germanium element based on the total weight of the PET is between 20-60 ppm, and the mole ratio of the germanium element content to the phosphorus element content is between 0.4-1.5, the polyester material processed has a low cyclic oligomer content level;

(10) Japan publication No. 9-296029 discloses that for PET containing germanium catalyst, when the alkaline-earth metal atom content based on the PET is between $1 \times 10^{-4} - 5 \times 10^{-3}$ moles, the cyclic oligomer content in the PET is low and the regenerated cyclic trimer from the melting process is considerably small;

(11) Japan publication No. 59-25815, 3-174441, 6-234834, and 3-47830 disclose a specific process to reduce oligomers in PET by placing the PET into boiling water, thereby reducing the residual cyclic oligomers in the PET chips and the regenerated cyclic oligomers during processing;

(12) U.S. Pat. No. 6,020,421 discloses the use of a PET composition containing a metal atom A and a phosphide containing a valance of 5, wherein the metal atom A can be an antimony atom, a titanium atom, or a germanium atom, and the phosphide can be selected from the phosphate group consisting of an orthophosphoric acid salt, a metaphosphoric acid salt, a polymetaphosphoric acid salt $(HPO_3)m$ (where $m \geq 3$), and a polyphosphoric acid $Hn+2PnO_3n+1$ (where $n \geq 2$);

(13) U.S. Pat. No. 5,948,458 discloses that the addition of phosphate into the plastic used for wrapping food creates an ultraviolet ray resistance effect in the plastic which help preserves the integrity and coloration of food; however, this patent does not disclose any cyclic oligomer content issues.

(14) U.S. Pat. No. 5,744,572 discloses the addition of carboxy phosphonic acid which catalyzes the reaction rate of polyester; however, it did not mention the effect on cyclic oligomer contents.

All of the aforementioned prior arts and/or publication do not mention the addition of a calcium phosphate compound having a $Ca_3(PO_4)_2$ structure or a $Ca_5OH(PO_4)_3$ structure or the simultaneous addition of a phosphoric ester having structure (1), or the addition of two or more than two compounds in order to restrain the cyclic oligomer content in the PET chips and their related manufactured products thereof.

SUMMARY OF THIS INVENTION

An object of this invention is to disclose a manufacturing method and compounds added thereof capable of greatly reducing the cyclic oligomer content in manufactured PET chips, as compared to the manufacturing method and compounds thereof disclosed in U.S. Pat. No. 6,392,005.

Another object of this invention is to disclose an additive, a calcium phosphate compound and a carboxy phosphonic acid compound capable of reducing the cyclic oligomer content in manufactured PET chips, wherein the calcium phosphate is selected from the group consisting of a $Ca_3(PO_4)_2$ structure and a $Ca_5OH(PO_4)_3$ structure, and the carboxy phosphonic acid compound has a structure (1) as follows:

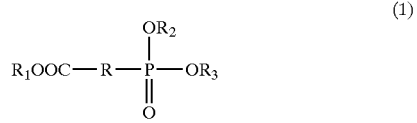

(1)

wherein $R_1$, $R_2$, and $R_3$ are alkyls or hydrogen atoms and R is an alkyl.

Still, another object of this invention is to disclose that addition of the calcium phosphate compound or the carboxy phosphonic acid having structure (1) of the present invention into the polymerization-reaction manufacturing stage of the PET material decreases the cyclic oligomer residues in the resulting PET chips, and effectively restrains the regeneration of cyclic oligomers during processing.

Yet, another object of this invention, which is a preferred embodiment of the present invention, is to disclose that the simultaneous addition of the calcium phosphate compound and the compound having structure (1) of the present invention, during the melt-polymerization manufacturing stage of the polyester chips, results in the producing of polyester material and their related polyester products thereof containing less cyclic oligomer content than the process disclosed in U.S. Pat. No. 6,392,005.

A further object of this invention, which is a preferred embodiment of the present invention, is to disclose that the addition of the calcium phosphate compound and the compound having structure (1) of the present invention and the PI compound disclosed in our U.S. Pat. No. 6,392,005 results in a decrease in the cyclic oligomer content in the obtained PET chips and their related processed products thereof.

Yet, a further object of this invention is to disclose that the novel manufacturing methodology disclosed by the present invention appropriately decreases the addition amount of the PI compound disclosed in our U.S. Pat. No. 6,392,005 and results in overall reduction in manufacturing cost.

Other objects, aspects, advantages and novel features of the invention detail will become more apparent from the following description.

DETAILED DESCRIPTION OF THIS INVENTION AND THE PREFERRED EMBODIMENTS

The PET of the present invention can be obtained from a purified terephtalic acid (PTA) synthesis process in which purified terephthalic acid and ethylene glycol (EG) first undergo direct esterification and second undergoes melt polymerization. Alternatively, the PET of the present invention can be obtained from a dimethyl terephthalate (DMT) synthesis process in which dimethyl terephthalate and ethylene glycol first undergo transesterification and second undergoes melt polymerization. The viscosity of the PET obtained from each of these processes is further increased to an appropriate level by solid-state polymerization. As compared to the DMT process, the PTA process is the preferred process choice of the present invention.

The present invention adds, before completion of the melt-polymerization PET synthesizing reaction, calcium phosphate selected from the group consisting of a $Ca_3(PO_4)_2$ structure or a $Ca_5OH(PO_4)_3$ structure and a carboxy phosphonic acid having a structure (1) as follows:

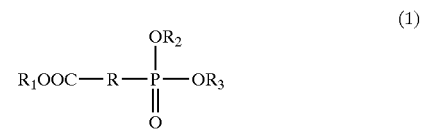

(1)

wherein $R_1$, $R_2$, and $R_3$ are alkyls or hydrogen atoms and R is an alkyl.

The calcium phosphate and the carboxy phosphonic acid compounds of the present invention can be injected into the initial slurry mixture containing PTA and EG or can be injected during the esterification reaction stage process. Alternatively, the injection can take place during the polymerization reaction stage process of the present invention.

When the calcium phosphate is added without the addition of the carboxy phosphonic acid compound having structure (1) and the PI compound disclosed in U.S. Pat. No. 6,392,005, a preferred amount of the calcium phosphate added based on the total weight of the PET polymer is between 50–500 ppm. A more preferred quantity range of the calcium phosphate added based on the total weight of the polymer is between 100–450 ppm. Addition of this preferred range Is done without the addition of the carboxy phosphonic acid compound having structure (1) and the PI compound disclosed in U.S. Pat. No. 6,392,005.

When the compound having structure (1) is added without the addition of calcium phosphate and the PI compound disclosed in U.S. Pat. No. 6,392,005, a preferred amount of the added compound having structure (1) is between 100–700 ppm based on the total weight of the PET polymer. A more preferred quantity range of the structure (1) added based on the total weight of the polymer is between 100–400 ppm. Addition of this preferred range is done without the addition of the calcium phosphate and the PI compound disclosed in U.S. Pat. No. 6,392,005.

When the calcium phosphate compound having structure (1) and the PI compound disclosed in U.S. Pat. No. 6,392,005 are added simultaneously, a preferred amount of the calcium phosphate added based on the total weight of the PET polymer is between 100–300, a preferred amount of the carboxy phosphonic acid compound having structure (1) added based on the total weight of the PET polymer is between 100–200 ppm, and a preferred amount of the PI added based on the total weight of the PET polymer is between 100–500 ppm.

Instead of the $Ca_5OH(PO_4)_3$ structure, the calcium phosphate compound of choice has the structure $Ca_3(PO_4)_2$. This is because we have discovered that the latter has better effect on restraining cyclic oligomer production than the former. The compound having structure (1) of the present invention is preferably a compound called triethyl phosphonoacetate (hereinafter referred to as TEPA) having a structure (2) as follows:

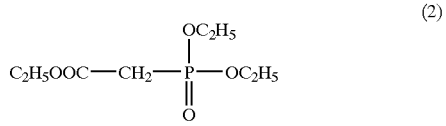

(2)

Based on the product application requirement of the present invention, a heat stabilizer, a toner or a dye, an ultraviolet ray absorbent, a crystallization accelerator, a static electricity preventer, an oxidization resistant or a lubricant can be added to the reaction mixture.

An antimony catalyst such as an antimony trioxide compound or an antimony acetate compound may be used during the manufacturing process of the PET of the present invention, wherein the antimony compound content can be no more than 300 ppm based on the total weight of the PET. In the place of an antimony catalyst, a germanium dioxide catalyst may be used during the manufacturing process of the PET of the present invention, wherein the germanium content can be no more than 100 ppm based on the total weight of the PET. Alternatively, a titanium catalyst may be used during the manufacturing process of the PET of the present invention, wherein the titanium content can be no more than 10 ppm based on the total weight of the PET. The PET of the present invention can be either a homogeneous polymer or a copolymer comprising a dicarboxylic acid, or diol compounds such as diethylene glycol (DEG), isophthalic acid (IPA), 2,6-naphthalene dicarboxylic acid and cyclohexane dimethanol (CHUM).

The PET of the present invention is first manufactured into chips with intrinsic viscosity of between 0.45–0.65 dl/g preferably between 0.57–0.63 dlg, by a melt-state polymerization process. Next, the intrinsic viscosity is increased to above 0.70 dl/g by a solid-state polymerization process. The solid-state polymerization process uses a stir-batch type operation under vacuum conditions. In place of a stir-batch type operation, the solid-state polymerization reaction may use a continuous tower tank through which an inert gas such as nitrogen gas or carbon dioxide is fed.

After solid-state polymerization the PET of the present invention, at the level of the preset intrinsic viscosity, is analyzed for residual cyclic oligomer content level. Analysis for the cyclic oligomer content level begins with the manufacturing of PET bottle embryos using an injection machine such as an ASB 50H model and then analyzing the cyclic oligomers regenerated from the melting process.

The method of analyzing the cyclic oligomer content level of the present invention comprises the following steps: weighing 1000 grams of the PET sample material; dissolving the sample into a transparent solution of hexafluoroisopropanol solvent; filtering the solution; evaporating the filtrate to obtain white crystallized cyclic oligomer powder; dissolving the white crystallized cyclic oligomer powder into a transparent solution of dioxane; and analyzing the resulting mixture with a high efficient liquid chromatographer to measure the cyclic trimer content level, the cyclic tetramer content level, the cyclic pentamer content level, the cyclic hexamer content level, the cyclic heptamer content level and mainly the cyclic trimer content level. The overall cyclic oligomer content level content is the summation of the measured cyclic tetramer content level, the measured cyclic pentamer content level, the measured cyclic hexamer content level, the measured cyclic heptamer level and the measured cyclic trimer content level.

Based on the aforementioned description manufacturing process and analysis, it is observed that the present invention further decreases and restrains the cyclic oligomer content level in the PET chips of the invention and in the related production process thereof by adding at least one compound selected from die group consisting of calcium phosphate having either a $Ca_3(PO_4)_2$ structure or a $Ca_5OH(PO_4)_3$ structure and a carboxy phosphonic acid compound having structure (1).

EXAMPLES AND COMPARATIVE EXAMPLES

The following examples and comparative examples are provided to further illustrate the characteristics of the present invention. The examples and comparative examples are provided only to illustrate the present invention and should not be construed as limitations.

Example 1

PTA and EG are used as raw materials. The quantity of PTA is 10.38 kg. The mole ratio of EG to PTA added to the slurry composition is 1.5. The slurry containing the PTA and die EG mixture is blended and 140 ppm of phosphoric acid based on the weight of the polymer is added. The temperature of the slurry mixture is then raised up to between 200° C.-250° C. and an esterification reaction process is conducted for 4 hours under a reaction pressure of between 1.5-2.0 kg/cm². When the esterification reaction process ratio has reached over 95%, the PI compound (Brand name, Irganox-1425; source, Ciba Corp.), the calcium phosphate compound $Ca_3(PO_4)_2$, and the germanium dioxide catalyst are added to the reaction mixture. The lrganox-1425 compound in an amount of 1000 ppm based on the overall weight of polymer is added, the calcium phosphate, Ca$_3$(PO$_4$)$_2$, in the amount of 200 ppm based on die overall weight of the polymer is added, and the germanium dioxide catalyst in an amount of 140 ppm based on the overall weight of polymer is added respectively.

After the addition of the aforementioned compounds, the reaction undergoes a vacuum polymerization reaction process. The first stage of the vacuum polymerization reaction process takes one hour at a reaction pressure which decreases from normal pressure down to 10 torr and occurs at a reaction temperature of between 250° C.-270° C. The second stage of the vacuum polymerization reaction process decreases the vacuum intensity down to below 1 torr at a reaction temperature of between 270° C.-285° C., and the stirring/mixing speed of the reaction decreases gradually along with the viscosity. After the second stage of the vacuum polymerization process, the reaction stops when the intrinsic viscosity reaches 0.60 dl/g and the polymer material is unloaded to a cooling water tank and cut into column-shape raw polyester chips with a cutting machine.

Subsequently, the raw polyester chips are loaded in a twin-awl revolving vacuum drying tank with a vacuum intensity of about 1 torr. The polyester chips are then heated according to the following steps: the polyester chips are heated to 130° C., the temperature is raised to 180° C. and then the chips are crystallized for three hours. When the external heating temperature of 230° C. is applied to the mixture, the material temperature reaches 200° C. where its temperature is maintained for 20 hours and then immediately cooled down so as to obtain the PET chips of the present invention.

In order to analyze the intrinsic viscosity and the cyclic trimmer content level thereof; the polyester chips are first manufactured into 2 liters bottles with an ASB-50 inject-blow-molding machine and then the cyclic trimmer content of the bottles is analyzed. The analyzed results are listed in Table 1, wherein the amounts of added additives and/or compounds are all calculated based on the total weight of polymer.

Example 2

The process of this example is similar to the process of Example 1, except that only the calcium phosphate, Ca$_3$(PO$_4$)$_2$, in an amount of 450 ppm is added to the mixture. The addition is done in the absence of both the P1 compound and the carboxy phosphonic acid compound having structure (1). After the solid-phase polymerization reaction process and inject-blow-molding process as described in Example I, the results obtained are listed in Table 1.

Example 3

The process of this example is similar to the process of Example 1, except that only the P1 compound (Irganox-1425) in an amount of 1000 ppm and the carboxy phosphonic acid (TEPA) compound having structure (1) in an amount of 150 ppm are added to the mixture. The addition is done in the absence of the calcium phosphate compound. After the solid-phase polymerization reaction process and the inject-blow-molding process as described in Example 1, the results obtained are listed in Table 1.

Example 4

The process of this example is similar to the process of Example 1, except that only the PI compound (lrganox-1425) in an amount of 500 ppm and the calcium phosphate, Ca$_3$(PO$_4$)$_2$, in an amount of 350 ppm are added to the mixture. The addition is done in the absence of the carboxy phosphonic acid compound having structure (1). After the solid- phase polymerization reaction process and the inject-blow-molding process described in Example 1, the results obtained are listed in Table 1.

Example 5

The process of this example is similar to the process of Example 1 , except that only the P1 compound (Irganox-1425) in an amount of 500 ppm, the calcium phosphate compound, Ca$_3$(PO$_4$)$_2$, in an amount of 300 ppm and the carboxy phosphonic acid (TEPA) compound having structure (1) in an amount of 150 ppm are added to the mixture. After the solid-phase polymerization reaction process and the inject-blow-molding process as in Example 1, the results obtained are listed in Table 1.

Example 6

The process of this example is similar to the process in Example 1 except that only the PI compound, Irganox-1425, in an amount of 500 ppm and the calcium phosphate, Ca$_5$OH(PO$_4$)$_3$, in an amount of 300 ppm are added to the mixture. The addition is done in the absence of the carboxy phosphonic acid having structure (1). After the solid-phase polymerization reaction and the inject-blow-molding process as described in Example 1, the results obtained are listed in Table 1.

Comparative Example 1

The process of this example is similar to the process in Example 1, except that this process occurs in the absence of the P1 compound, the calcium phosphate, and the carboxy phosphonic acid having structure (1). After the solid-phase polymerization reaction process and the inject-blow-molding process as described in Example 1, the results obtained are listed in Table 1.

Comparative Example 2

The process of this example is similar to the process in Example 1, except that only the P1 compound in an amount of 1000 ppm is added to the mixture. The addition is done in the absence of the calcium phosphate and the carboxy phosphonic acid having structure (1). After the solid-phase polymerization reaction and the inject-blow-molding process as described in Example 1, the results obtained are listed in Table 1.

TABLE 1

| Item Example | additives | | | Chips Intrinsic viscosity | Cyclic oligomer content in chips | Cyclic oligomer content in bottles |
| --- | --- | --- | --- | --- | --- | --- |
| | PI compound* | Calcium phosphate | Compound** having structure(1) | | | |
| Example 1 | 1000 ppm I-1425 | 200 ppm Ca$_3$(PO$_4$)$_2$ | 0 ppm | 0.78 | 0.553 | 0.603 |
| Example 2 | 0 ppm | 450 ppm Ca$_3$(PO$_4$)$_2$ | 0 ppm | 0.76 | 0.436 | 0.536 |
| Example 3 | 1000 ppm I-1425 | 0 ppm | 150 ppm TEPA | 0.80 | 0.429 | 0.533 |

TABLE 1-continued

| Item Example | additives | | | Chips Intrinsic viscosity | Cyclic oligomer content in chips | Cyclic oligomer content in bottles |
|---|---|---|---|---|---|---|
| | PI compound* | Calcium phosphate | Compound** having structure(1) | | | |
| Example 4 | 500 ppm I-1425 | 350 ppm Ca₃(PO₄)₂ | 0 ppm | 0.78 | 0.441 | 0.512 |
| Example 5 | 500 ppm I-1425 | 300 ppm Ca₃(PO₄)₂ | 150 ppm TEPA | 0.76 | 0.392 | 0.473 |
| Example 6 | 500 ppm I-1425 | 300 ppm Ca₃OH(PO₄)₃ | 0 ppm | 0.76 | 0.467 | 0.553 |
| Comparative example 1 | 0 ppm | 0 ppm | 0 ppm | 0.79 | 0.657 | 0.777 |
| Comparative example 2 | 1000 ppm I-1425 | 0 ppm | 0 ppm | 0.81 | 0.592 | 0.679 |

*PI compound of this experiment is Irganox-1425.
**Compound having structure (1) of this experiment is Triethyl Phosphonoacetate (TEPA).

It should be understood, however, that even though numerous characteristics and advantages of the present invention have been set forth in the foregoing description, together with details of the method, the process and the description of component ratios and related examples, the disclosure is illustrative only and changes may be made in the description within the principles of the invention to the full extent indicated by the broad general meaning of the terms in which the appended claims are expressed.

What is claimed is:

1. A method for decreasing cyclic oligomer content in polyester products comprising:
adding, during the manufacturing process of polyethylene terephthalate, calcium phosphate at least one selected from the group consisting of a $Ca_3(PO_4)_2$ structure, a $Ca_5OH(PO_4)_3$ structure and a carboxy phosphonic acid with a structure (1) as follow:

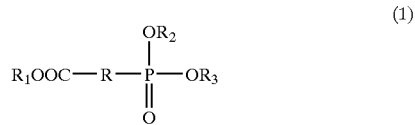
(1)

wherein $R_1$, $R_2$, and $R_3$ are alkyls or hydrogen atoms and R is an alkyl.

2. The method for decreasing cyclic oligomer content in polyester products during the manufacturing process of the polyethylene terephthalate according to claim 1, wherein the amount of added calcium phosphate is between 50–500 ppm based on the weight of the PET polymer, and the amount of added structure (1) compound is between 100–700 ppm based on the weight of the PET polymer.

3. The method for decreasing the cyclic oligomer content in polyester products according to claim 2, wherein the intrinsic viscosity of the obtained PET chips is increased up to above 0.70 dl/g after solid phase polymerization.

4. The method for decreasing the cyclic oligomer content in polyester products according to claim 2, wherein a polycondensation catalyst used for melting of the polyethylene terephthalate can be selected from a group consisting of an antimony catalyst; a germanium catalyst and a titanium catalyst.

5. The polycondensation catalyst according to claim 4, wherein said antimony catalyst is selected from a group consisting of antimony trioxide and antimony acetate, said germanium catalyst is selected from a group consisting of germanium dioxide, tetraethyl germanium oxide and n-tetrabutyl germanium oxide and said titanium catalyst is tetrabutyl titanium oxide.

6. The manufacturing method according to claim 2, wherein bottle embryos are made from polyester chips derived from said method using an injection machine.

7. The manufacturing method according to claim 6, wherein polyester bottles are made from said embryos through a stretch-blow-molding process.

8. A method for decreasing cyclic oligomer content in polyester products comprising: adding, during the manufacturing process of polyethylene terephthalate, calcium phosphate, P1 and carboxy phosphonic acid with a structure (1) as follow:

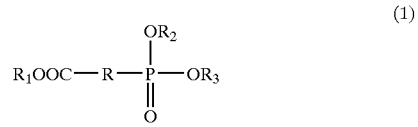
(1)

wherein $R_1$, $R_2$, and $R_3$ are alkyls or hydrogen atoms and R is an alkyl and said P1 compound with a structure as follow:

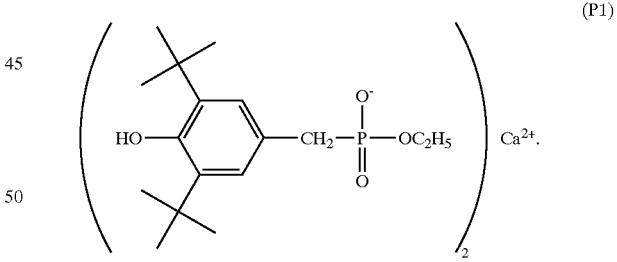
(P1)

9. The method for decreasing cyclic oligomer content in polyester products during the manufacturing process of polyethylene terephthalate according to claim 8, wherein the amount of added calcium phosphate based on the weight of the PET polymer is between 100–300 ppm, the amount of added carboxy phosphonic acid with structure (1) compound based on the weight of the PET polymer compound is between 100–200 ppm, the amount of added PI compound based on the weight of the PET polymer is between 100–500 ppm.

10. The method for decreasing the cyclic oligomer content in polyester products according to claim 9, wherein the intrinsic viscosity of the obtained PET chips is increased up to above 0.70 dl/g after solid phase polymerization.

11. The method for decreasing the cyclic oligomer content in polyester products according to claim 9, wherein a polycondensation catalyst used for melting of the polyethylene terephthalate can be selected from a group consisting of an antimony catalyst, a germanium catalyst and a titanium catalyst.

12. The polycondensation catalyst according to claim 11, wherein said antimony catalyst is selected from a group consisting of antimony trioxide and antimony acetate, and said germanium catalyst is selected from a group consisting of germanium dioxide, tetraethyl germanium oxide and n-tetrabutyl germanium oxide, and said titanium catalyst is tetrabutyl titanium oxide.

13. The manufacturing method according to claim 9, wherein bottle embryos are made from polyester chips derived from said method using an injection machine.

14. The manufacturing method according to claim 13, wherein polyester bottles are made from said embryos through stretch-blow-molding process.

* * * * *